July 15, 1958     H. E. DALL     2,842,962
PRESSURE DIFFERENTIAL PRODUCING DEVICE
Filed Oct. 25, 1954
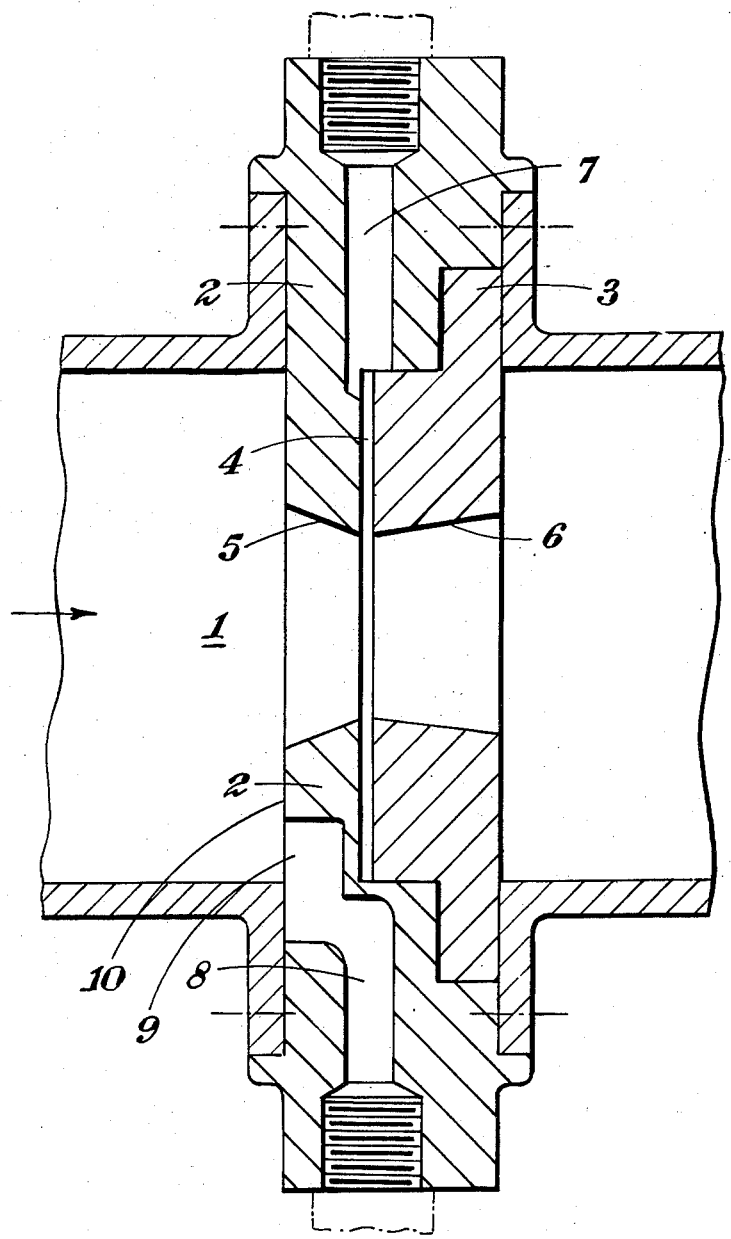
Inventor:
Horace Edward Dall
By his attorneys:
Baldwin & Wight

2,842,962

PRESSURE DIFFERENTIAL PRODUCING DEVICE

Horace Edward Dall, Luton, England, assignor to George Kent Limited, London, England, a company of Great Britain Application October 25, 1954, Serial No. 464,444

Claims priority, application Great Britain October 29, 1953

4 Claims. (Cl. 73—211)

The measurement of the flow of fluids is frequently performed by means of a pressure differential producing device disposed in the path of the fluid. There are two main types of such devices. One type consists of a plate-like member provided with an orifice. The other type is the venturi tube which may comprise an entrance cone for diminishing the cross section of the fluid and an exit cone for increasing the cross section to its original value. The former type of device has the advantage of being cheap to manufacture and of occupying little space, e. g. one inch, in the pipe carrying the fluid; it suffers from the disadvantage, however, of producing a substantial head loss. The venturi tube produces a much smaller head loss but it occupies considerable space, e. g. several feet, and is relatively expensive to manufacture.

The object of the invention is to provide a plate-like member for the measurement of fluid flow which will produce only a small head loss.

According to the invention, a pressure differential producing device comprises a plate-like member which is adapted to be interposed in a pipeline for the differential pressure measurement of fluid flow therein, the member having an orifice therethrough comprising truncated inlet and outlet cones whose smaller ends are adjacent to one another and are separated by a throat, communicating with a pressure offtake extending substantially radially through the member, of length between .02 $d$ and .1 $d$ where $d$ is the diameter of the throat, the included angle of the inlet cone being between 30° and 60° and that of the outlet cone being between 12° and 18°.

The member may comprise two elements one of which nests in the other, leaving a gap constituting the said throat.

The device proferably comprises a pressure offtake extending substantially radially through the member and having a port in the face of the member on the inlet side thereof.

The invention also comprises a pipeline in which is interposed a pressure differential producing device as described above, the thickness of the plate-like member being of the order of from one half to one quarter of the diameter of the pipeline.

The invention is illustrated, by way of example, in the accompanying drawing which shows a section through a pressure differential producing device.

Referring to the drawing, there is shown interposed in a pipeline 1, a plate-like member or structure comprising two elements 2, 3, the element 3 of which nests in the element 2 so as to leave a radial gap 4 between them. The element 2 is provided with a truncated conical inlet orifice 5 whose included angle is 40°. The element 3 is provided with a truncated conical outlet orifice 6 whose included angle is 16°. It will be seen from the drawing that the smaller ends of the orifices 5, 6 are adjacent to one another and are separated by a throat consisting of the radial gap 4. The length of this throat is .03 $d$ where $d$ is the diameter of the throat. The throat communicates with a pressure offtake 7 from which a tapping of the pressure at the throat may be taken, the pressure offtake 7 extending substantialy radially through the plate-like member. The element 2 is also provided with a pressure offtake 8 which enables a tapping of the pressure on the inlet side of the plate-like member to be taken. The pressure offtake 8 extends substantially radially through the plate-like member and has a port 9 in the face of the said member on the inlet side 10 thereof. The thickness of the plate-like member is .411 D where D is the diameter of the pipeline 1, the thickness of the element 3 being .24 D.

What is claimed is:

1. A pressure differential producing device adapted to be interposed in a pipeline for the differential pressure measurement of fluid flow therein, said device comprising a plate-like structure having a thickness of from one half to one fourth the diameter of the pipeline and formed with an orifice having a throat of a length between one tenth and two hundredths the diameter of the throat, said structure having a truncated cone-shaped inlet and a truncated cone-shaped outlet communicating with said throat and so formed that the smaller ends of the cones are adjacent to one another, the included angle of said inlet being between 30° and 60° and the included angle of said outlet being between 12° and 18°.

2. A pressure differential producing device as claimed in claim 1 in which the plate-like structure comprises two elements, one of which nests in the other leaving a gap constituting said throat.

3. A pressure differential producing device adapted to be interposed in a pipeline for the differential pressure measurement of fluid flow therein, said device comprising a plate-like structure having a thickness of from one half to one fourth the diameter of the pipeline and formed with an orifice having a throat of a length between one tenth and two hundredths the diameter of the throat, said structure having a truncated cone-shaped inlet and a truncated cone-shaped outlet communicating with said throat and so formed that the smaller ends of the cones are adjacent to one another, said structure having a substantially radially extending pressure offtake communicating with said throat and a second substantially radially extending pressure offtake communicating with a port in the inlet side of said structure, the included angle of said inlet being between 30° and 60° and the included angle of said outlet being between 12° and 18°.

4. A pressure differential producing device as claimed in claim 3 in which the plate-like structure comprises two elements, one of which nests in the other leaving a gap constituting said throat.

References Cited in the file of this patent

UNITED STATES PATENTS

| 1,480,661 | Brown | Jan. 15, 1924 |
| 1,559,547 | Brown | Nov. 3, 1925 |
| 1,785,501 | Secor | Dec. 16, 1930 |
| 1,882,062 | Campbell | Oct. 11, 1932 |
| 2,127,501 | Dall | Aug. 23, 1938 |
| 2,704,555 | Dall | Mar. 22, 1955 |

FOREIGN PATENTS

| 332,116 | Great Britain | July 17, 1930 |
| 689,474 | Great Britain | Mar. 25, 1953 |